US006997592B2

(12) United States Patent
Jeon

(10) Patent No.: US 6,997,592 B2
(45) Date of Patent: Feb. 14, 2006

(54) ADVERTISING APPARATUS USING A LIGHT SWITCHING DEVICE

(75) Inventor: Young Jae Jeon, Seoul (KR)

(73) Assignee: Si Han Kim, Kyunggi-Do (KR)

( * ) Notice: Subject to any disclaimer, the term of this patent is extended or adjusted under 35 U.S.C. 154(b) by 111 days.

(21) Appl. No.: 10/204,163

(22) PCT Filed: Dec. 28, 2001

(86) PCT No.: PCT/KR01/02286

§ 371 (c)(1),
(2), (4) Date: Apr. 3, 2003

(87) PCT Pub. No.: WO03/027993

PCT Pub. Date: Apr. 3, 2003

(65) Prior Publication Data
US 2003/0159323 A1 Aug. 28, 2003

(30) Foreign Application Priority Data
Dec. 30, 2000 (KR) ............... 2000/86965

(51) Int. Cl.
A47F 11/00 (2006.01)
G02F 1/1335 (2006.01)
(52) U.S. Cl. ............. 362/561; 362/812; 40/448
(58) Field of Classification Search ........ 362/561, 362/125, 812; 40/124.02, 448, 452, 546; 349/10, 86, 88
See application file for complete search history.

(56) References Cited

U.S. PATENT DOCUMENTS

| 6,005,651 | A  | * | 12/1999 | Takahara et al. | 349/137 |
| 6,101,750 | A  | * | 8/2000  | Blesener et al. | 40/448  |
| 6,237,290 | B1 | * | 5/2001  | Tokimoto et al. | 52/236.3 |
| 6,314,669 | B1 | * | 11/2001 | Tucker          | 40/448  |
| 6,429,914 | B1 | * | 8/2002  | Kubota et al.   | 349/86  |
| 6,452,650 | B1 | * | 9/2002  | Nakao et al.    | 349/86  |

* cited by examiner

Primary Examiner—Y. My Quach-Lee
Assistant Examiner—Peggy A. Neils
(74) Attorney, Agent, or Firm—Norris, McLaughlin & Marcus

(57) ABSTRACT

Provided is an advertisement apparatus using a light switching device which transmits or shields light according as a power source or heat is supplied or not. The advertisement apparatus includes a light switching device transmitting light when a power source or heat is supplied thereto and shielding light of less than predetermined brightness when a power source or heat is not supplied thereto, or operating in a reverse manner, and an illuminator for illuminating an image onto the light switching device with light whose brightness is greater than the predetermined brightness. The light switching device can be used as the window of a building, and can present images of an advertisement using the illuminator for irradiating light from a projector, for example, to the light switching device. Therefore, the advertisement apparatus using a light switching device can be used for both indoor and outdoor advertising displays.

5 Claims, 2 Drawing Sheets

ADVERTISING APPARATUS USING A LIGHT SWITCHING DEVICE

TECHNICAL FIELD

The present invention relates to an advertisement apparatus using a light switching device which transmits or shields light according as a power source or heat is supplied or not, and more particularly, to an advertisement apparatus employing a light switching device capable of selectively dispersing or transmitting visible light according as a power source or heat is supplied or not, as a window or shielding film of a building, and using the window or shielding film as an advertising panel onto which an image is projected.

BACKGROUND ART

In outdoor advertising commonly found on an outdoor surface of a building or the like, large electric signs using light-emitting diodes or billboards using neon light are generally adopted. The outdoor advertising using the large electric signs permits moving-picture advertisement just like in indoor television advertising, giving potential customers a great variety of advertisement displays. In the outdoor advertising using the neon sign billboards, a variety of advertisement displays are provided by controlling colors of neon light, shapes of alphanumerical characters or lighting sequences of neon lamps.

However, since large electric signs or billboards are installed on external surfaces of buildings, installation thereof is limited in many ways and is not easy. Also, quite a bulky mounting surface of a building is required. In addition, since the large electric sign or billboard is installed on an external surface of a building, the appearance of the building may be spoiled. Further, the large-sized electric sign or billboard installed on the street may cause passers-by inconvenience. Once an electric sign or billboard is installed on a specific site, it is impossible to install another electric sign or billboard thereon.

Although large electric signs allow versatile advertising displays using moving pictures, the installation thereof is not cost-effective. Billboards using neon light only present a fixed image advertisement, that is, moving-picture advertisement display cannot be achieved unlike the large electric signs.

On these signs, the only way to change an advertisement display into another one is to remanufacture a sign or billboard after removing the current sign or billboard or to post another advertisement by adopting a new program. This implies very high costs for replacing advertisements and a waste of resources due to removal of an advertisement, which still has the value in use.

Meanwhile, it is often the case that various advertising materials are installed inside a building. In this case, however, a passage may become narrow, causing a passer-by inconvenience. That is to say, one of disadvantages of an indoor advertising apparatus is that an installation space problem may arise. Also, it is quite costly to install and remove advertisement materials, like outdoor advertising.

DISCLOSURE OF INVENTION

To solve the above-described problems, it is an object of the present invention to provide an advertisement apparatus employing a light switching device capable of selectively dispersing or transmitting visible light according as a power source or heat is supplied or not, as a window or shielding film of a building, and using the window or shielding film as an advertising panel onto which an image is projected.

To accomplish the above object, the present invention provides an advertisement apparatus using a light switching device, including a light switching device transmitting light when a power source or heat is supplied thereto and shielding light of less than predetermined brightness when a power source or heat is not supplied thereto, or operating in a reverse manner, that is, the light switching device shielding light of less than predetermined brightness when a power source or heat is supplied thereto and transmitting light when a power source or heat is not supplied thereto, and an illuminator for illuminating an image onto the light switching device with light whose brightness is greater than the predetermined brightness.

The light switching device may be used as a transparent window when light is transmitted therethrough according as the power is on, and may be used as a shield film when light is shielded according as the power is off. Instead of power supply, heat may be supplied to the light switching device to transmit or shield light.

In the present invention, the light switching device is preferably a polymer liquid crystal display formed of a mixture of a polymer and liquid crystals. Also, the light switching device is preferably formed of a polymer capable of transmitting or shielding light according as heat or electricity is supplied or not.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

A preferred embodiment of the present invention will now be described in detail with reference to the accompanying drawings.

In this embodiment, a liquid crystal display is used as a light switching device. The liquid crystal display is transparent to visible light by transmitting the visible light when the electric power is on, while it is opaque to visible light by dispersing the visible light when the power is off. Conversely, the liquid crystal display is operable such that it becomes opaque by dispersing visible light when the power is on, or it becomes transparent by transmitting the visible light when the power is off.

Figure 1:
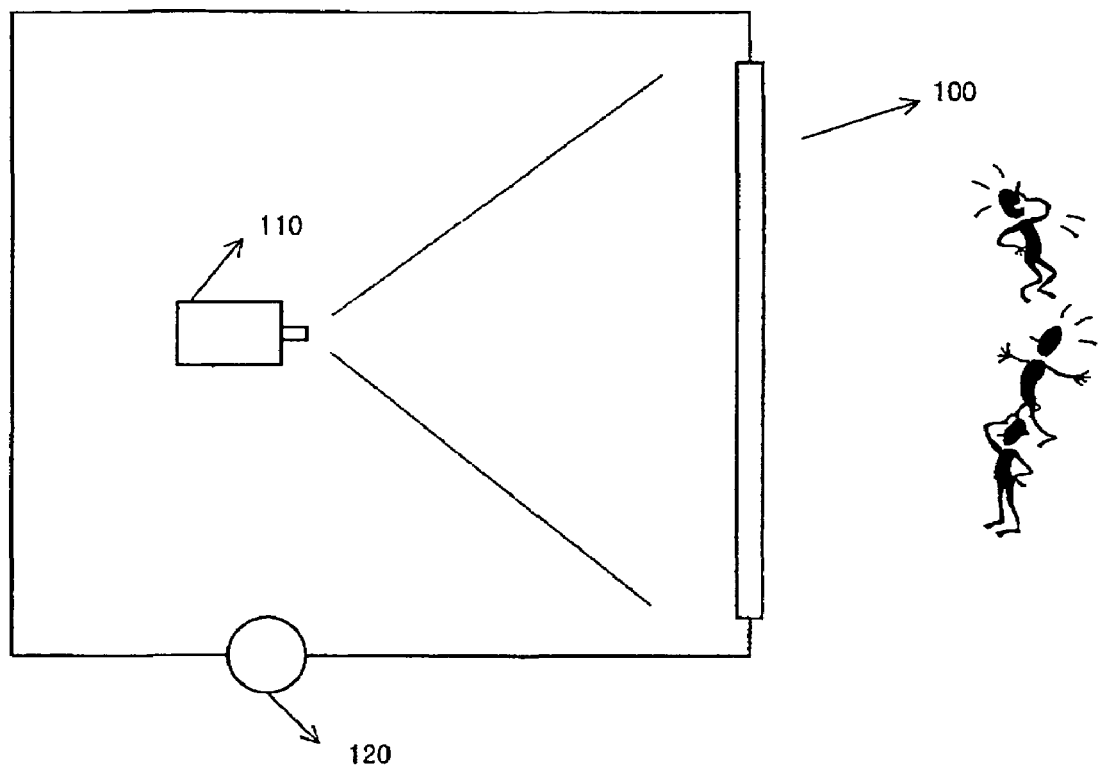
FIG. 1 is a schematic diagram of an advertisement apparatus according to the present invention, using a light switching device that transmits or shields light according as a power source is supplied or not.

FIG. 1 is a schematic diagram of an advertisement apparatus according to the present invention, using a light switching device that transmits or shield light according as a power source is supplied or not.

In FIG. 1, the advertisement apparatus according to the present invention includes a light switching device 100 transmitting or shielding light according as a power source is supplied or not, an illuminator 110 for illuminating an image onto the light switching device 100, and a power supply 120 for supplying power to the light switching device 100.

As the light switching device 100, a polymer liquid crystal display formed of a mixture of a polymer and liquid crystals can be used, the polymer liquid crystal display being transparent when light is transmitted therethrough according as the power is supplied from the power supply 120, and being opaque when light is dispersed therein.

As the illuminator 110 for image illumination, a generally used projector can be used. The projector used as the illuminator 110 can illuminate a great variety of images in the form of a photograph slide or video, so that advertisers can construct various advertising materials to present advertising.

In the case of using the polymer liquid crystal display as the light switching device 100, when the power is supplied, light is transmitted because the orientation of the liquid crystal is the same as that of the polymer. Thus, the light switching device 100 serves as a transparent glass window when it is installed as the window of a building.

When the power is off, the polymer liquid crystal display experiences dispersion of light due to difference in refractive indices of the liquid crystal and polymer. Thus, the polymer liquid crystal display becomes opaque so that the outside of the building cannot be seen through the window. In case that the light switching device 100 of the present invention is installed indoor, it serves as a shield film.

The advertisement apparatus using a light switching device according to the present invention can be applied to vehicle-mounted advertising by installing the same in mobile means such as vehicles.

Now, an advertisement method using the light switching device 100 according to the present invention will be described.

The light switching device 100 according to the present invention is configured such that an image of an advertisement is projected thereonto using the illuminator 110 when the power is off, thereby displaying the advertisement outside a building through the window thereof. In other words, when the power is off, the light switching device 100 becomes opaque and the outside cannot be seen through the window. Also, if the image of the advertisement is projected onto the light switching device 100 using the illuminator 110, light is dispersed according to a twist angle of a longer axis of a liquid crystal molecule. Thus, the light switching device 100 having the projected image can be used as an advertising panel.

In other words, the intense light containing the image of an advertisement projected by the illuminator 110 is dispersed among liquid crystal molecules forming the polymer liquid crystal display to then be transmitted through, while the light irradiated into the building cannot transmit through the light switching device 100. Thus, the image of an advertisement transmitted through the light switching device 100 is projected outside the building so that it can be seen outside. Alternatively, the image of an advertisement can be seen inside a building by installing the light switching device 100 indoors.

Figure 2:
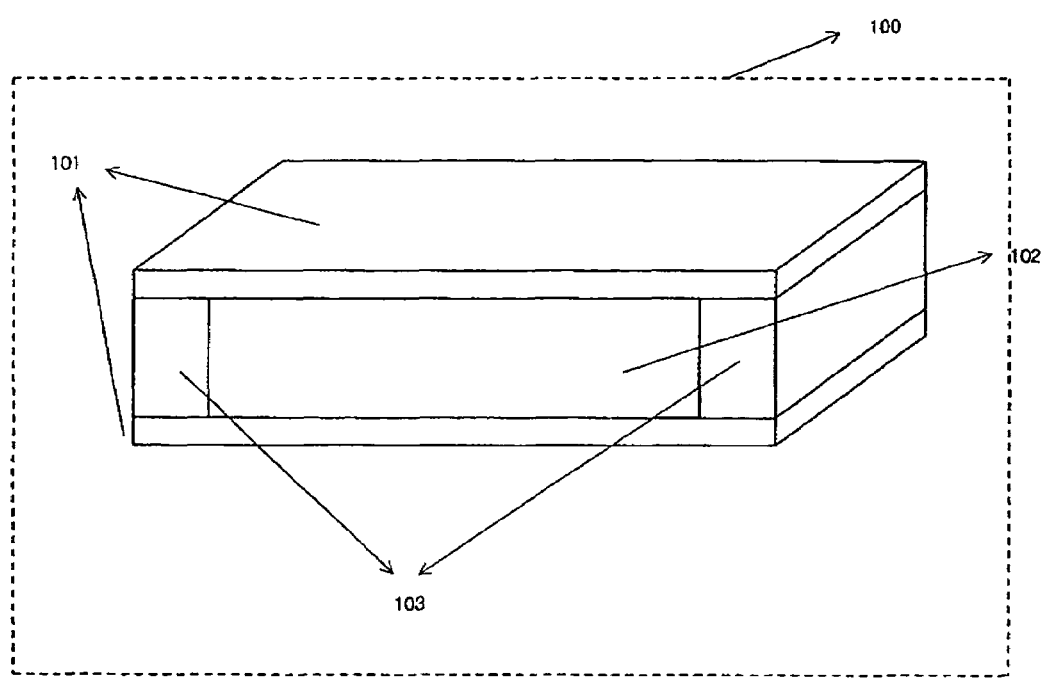
FIG. 2 is a cross-sectional view of a polymer liquid crystal display used as the light switching device according to the present invention.

FIG. 2 is a cross-sectional view of a polymer liquid crystal display used as the light switching device according to the present invention.

Referring to FIG. 2, a liquid crystal display used as the light switching device 100 is constructed of two sheets of glass substrates 101 with their peripheries sealed, spaced apart from each other by a spacer 103. The glass substrates 101 are coated with indium-tin oxide forming a transparent electrode. The inside of the glass substrates 101 spaced apart from each other by the spacer 103 is filled with a liquid crystal material 102 mixed with a polymer, or is filled with a polymer.

In the present invention, film-like substrates made of a solid material such as transparent acryl or plastic resin may be used instead of the glass substrates 101.

The polymer liquid crystal display can achieve high transmissivity and a desired viewing angle by making the effective refractive index of a liquid crystal phase the same with or different from the refractive index of the polymer, so that the window incorporated with the polymer liquid crystal display is made transparent or opaque.

Examples of the polymer liquid crystal display used as the light switching device 100 of the present invention include a polymer dispersed liquid crystal and a polymer assembled liquid crystal.

For example, the polymer assembled liquid crystal may be a polymer assembled liquid crystal obtained by mixing a ferroelectric liquid crystal exhibiting spontaneous polarization macroscopically because of its permanent dipole moments and an anti-ferroelectric liquid crystal with a polymer, or mixing a nematic liquid crystal with a polymer.

The light switching device 100 used in the present invention is not limited to the above-described polymer liquid crystal display and can have various modified applications. For example, a light switching device using heat or electricity, which turns into transparent glass due to light transmission according to application of heat or electricity and which turns into a shield film due to light shielding according to elimination of heat or electricity, can be used as the light switching device 100. Alternatively, a light switching device operable in a reverse manner, that is, the light switching device turning into a shield film according to application of heat or electricity and turning into transparent glass according to elimination of heat or electricity, can also be used.

As described above, in the advertisement apparatus using a light switching device according to the present invention, the light switching device can be used as a window of a building, and can be used as both indoor and outdoor advertising means since images of an advertisement can be presented through an illuminator for irradiating light from a projector, for example, to the light switching device.

Also, advertising display is allowed without installing a separate device on a building. Since the window of a building is used for an advertising purpose, there is no danger that the appearance of the building may be spoiled. Further, installation of the advertisement apparatus according to the present invention is easier than that of the conventional electric sign or billboard, and the advertisement contents thereof are easily changed without additional cost, unlike in the electric sign or billboard. Once installed, the advertisement apparatus according to the present invention can be used semi-permanently, which is cost-effective from the viewpoint of advertisers.

Since various patterns or moving pictures of an advertisement are projected from an illuminator such as a projector, a great variety of advertisement displays can be achieved compared to the conventional billboard having constant patterns or a fixed image. The appearance of a building can be distinguishable from others owing to unique, characteristic advertisement, thereby attracting the attention of potential customers more effectively to thus enhance adverting effects.

INDUSTRIAL APPLICABILITY

As described above, since the light switching device according to the present invention becomes a transparent window when the power is on so that the outside can be seen therethrough, and becomes opaque when the power is off (or vice versa), it is not necessary to install a separate window of a building. When the light switching device is installed for indoor use, it can be used as an advertising panel or home theater screen serving as a shield film for shielding an interior part of a building.

Further, the light switching device according to the present invention can be used as a double-sided screen in which a projected image can be seen simultaneously through a transparent glass substrate provided on its surface from the front and rear surfaces thereof (or inside and outside a building).

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An advertisement apparatus for use as an advertising panel or screen comprising:

a light switching device transmitting light when a power source or heat is supplied thereto and shielding light of less than a predetermined brightness when a power source or heat is not supplied thereto, or operating in a reverse manner; and an illuminator for illuminating an image onto the light switching device with light whose brightness is greater than the predetermined brightness, wherein, depending on whether the power source or heat is supplied to the light switching device when the image is illuminated onto the light switching device, the image is transmitted through the light switching device or displayed on the light switching device.

2. The advertisement apparatus according to claim 1, wherein the light switching device is used as a transparent window when light is transmitted therethrough according as the power is on, and is used as a shield film when light is shielded according as the power is off.

3. The advertisement apparatus according to claim 1, wherein the light switching device is used as a transparent window when light is transmitted therethrough according as heat is supplied thereto, and is used as a shield film when light is shielded according as heat is not supplied thereto.

4. The advertisement apparatus according to claim 2, wherein the light switching device is a polymer liquid crystal display formed of a mixture of a polymer and liquid crystals.

5. The advertisement apparatus according to claim 2, wherein the light switching device is formed of a polymer.

* * * * *